United States Patent Office 3,627,471
Patented Dec. 14, 1971

3,627,471
PREPARATION OF CHLORINE AND AMMONIA
FROM AMMONIUM CHLORIDE
Roger Botton, Paris, and Andre Steinmetz, Aubervilliers,
Seine-St.-Denis, France, assignors to Produits Chimiques
Pechiney-Saint-Gobain, Paris, France
No Drawing. Filed June 5, 1967, Ser. No. 643,366
Claims priority, application France, June 22, 1966,
66,392
Int. Cl. C01b 1/02; C01c 7/02
U.S. Cl. 23—193
13 Claims

ABSTRACT OF THE DISCLOSURE

Method of making ammonia and chlorine from ammonium chloride by thermal dissociation with a catalyst mass comprising a partly reduced metal oxide fixing the chlorine ion as a metallic chloride while the liberated ammonia gas passes off with water vapor and is captured. In a subsequent step of oxidation the chlorine is liberated and the metal oxide is in a higher state. This oxide is again partly reduced and the process is repeated with new ammonium chloride. In the improvement the catalyst mass is made of molten alkali metal chlorides containing in suspension a finely divided metal oxide such as Fe, Ni, Co, and preferably Fe.

---

This invention relates to the manufacture of ammonia and chlorine from ammonium chloride or from the products of dissociation of ammonium chloride.

In copending application, Ser. No. 283,684 now Pat. No. 3,393,048, July 16, 1968, there is described a method of making ammonia and chlorine from ammonium chloride by thermal dissociation in contact with a catalyst mass comprising a partly reduced metal oxide as initiator which captures the chlorine liberated during the dissociation, fixing the chlorine ion as a metallic chloride while the liberated ammonia gas passes off with water vapor and is captured. In a subsequent step the chlorinated metallic oxide is oxidized, usually by an oxidizing gas, liberating the chlorine as such and oxidizing the metal oxide to a higher state. This oxide is again partly reduced, usually by a gaseous reducing agent such as CO or H and the initiator is again ready for use. Iron oxide is the preferred metallic oxide and the preferred method of use was to reduce it from its highest valence $Fe_2O_3$ to about $Fe_3O_4$. The process can be started with $Fe_3O_4$ but the oxidation step which liberates the chlorine raises it to about $Fe_2O_3$ so that for practical purposes the process is a cycle beginning with the reduction of $Fe_2O_3$ to a lower state such as $Fe_3O_4$ or FeO.

The industrial use of the process is great in itself and more so because it can be coupled to the manufacture of sodium carbonate by the ammonia process.

This invention is an improvement over that of the parent case but as to all common subject matter it is entitled to the benefit of the filing date of that case in the U.S. and in France, and to the filing date of foreign applications listed in the oath.

We have now discovered that it is advantageous to carry out the process in a liquid medium, the ammonium chloride being thermally dissociated in a molten salt bath in three basic steps, partial reduction, chlorination, oxidation. The objects of the invention were to improve the efficiency of the process as to release of the gases, simplify the handling of the products and the control of the reactions, improve temperature control of the stages of the process, and to simplify the apparatus and prolong its life.

The objects of the invention are accomplished generally speaking by the liquid phase method of preparing ammonia and chlorine from ammonium chloride which comprises decomposing ammonium chloride by heat in contact with a liquid reaction mass of molten salts containing in suspension a finely divided, partly reduced, metal oxide herein described as initiator of the type of metal having a valence greater than two when fully oxidized, and which is preferably selected from the group consisting of Fe, Ni, Co.

According to the preferred form of the invention ammonium chloride is heated to decomposition in contact with a liquid reaction mass of which the essential ingredients are molten salts holding in suspension some finely divided metallic oxides in a partly reduced state. The dispersed oxides, initially in highly oxidized state, are dispersed in the molten medium, a reducing gas such as H or CO is passed into the mass, partly reducing the oxide. The ammonium chloride is then admitted to the mass, dissociates, the chlorine is captured and fixed on the oxide and the $NH_3$ and $H_2O$ pass off and are captured and stored. The chlorinated oxide in the reaction medium is now oxidized more fully by passing an oxidizing gas such as air or oxygen, or chlorine containing gas into the medium and the chlorine is released, by means of a current of an oxygen containing gas, passes off, and is captured and stored. The reaction vessel is purged of oxygen containing gas by nitrogen or other inert gas and the process begins again with partial reduction.

The molten salts are chosen on a basis of melting point, it being required only that they be liquid at the temperatures required in the process. As these temperatures are above 300° C. it suffices to choose salts molten at such temperatures, e.g. the alkali metal chlorides. Anhydrous salts are preferred.

The initiators are metallic oxides of variable valence, iron oxide being preferred and other oxides of the iron group, e.g. Ni and Co being useful. Iron is preferably admitted to the step of partial reduction at a valence near $Fe_2O_3$, and the others at equivalent stages of high oxidation. Minerals containing the oxides are useful. The oxide initiators should be finely divided, particle sizes circa 20 to 250 m$\mu$ being advantageous. The initiators can be associated with finely divided activators for them, such as copper and manganese salts and oxides, and salts or oxides of rare earth metals.

The reaction medium may be made up by mixing the dry powdered salts and activators and fusing them with agitation, the particles of metal oxide being put into suspension with agitation. The useful metal oxides remain solid at the temperatures employed, making a solid-liquid reaction medium.

As a modification of the process, the initial step may employ a chloride of the metal instead of its oxide, but the first step of the process must then be to oxidize the chloride or other halide, which can conveniently be done as the regular step of oxidation to release chlorine. The process can equally be started with an oxide in a highly efficient stage of activity, e.g. $Fe_3O_4$, but in this case also the process falls into its regular routine as it progresses.

The reaction medium containing the initiator is ordinarily subjected to the passage of a reducing gas such as CO or hydrogen, or to mixtures thereof at a temperature about 500–550° C. which constitutes the regular first or partial-reduction step. The flow of reducing gas is cut off when the desired degree of reduction has been accomplished. The temperature of the reaction medium is then lowered to 300–420° C. and preferably near but above the temperature of sublimation of ammonium chloride, which is intermixed with the reaction medium in either solid or gas state; when in gas phase it is advisable to mix it with an inert carrier gas such as $CO_2$ or nitrogen. Ammonia and water vapor are given off within the medium and chlorine fixes itself on the oxide. The ammonia and water vapor are captured by ordinary apparatus which needs no description. When the flow of ammonium chloride is ended, the capacity of the oxide to fix chlorine approaching completion, the temperature is raised to 510–530° C. to release more ammonia. And the reaction medium receives an admixture of oxidizing gas such as oxygen with or without chlorine, which oxidizes the partly reduced, chlorinated oxides, still at 510–530° C., an oxygen containing current of gas releases the chlorine from the oxides, which passes off as a gas and is captured by ordinary apparatus for that purpose. When the release of chlorine indicates release approaching completion the apparatus is purged with an inert gas such as nitrogen and a new cycle is begun with partial reduction at 500–550° C. as aforesaid.

The reactions are in liquid-solid-gas phase, or in liquid-gas phase. Agitation keeps the solids in suspension, improves the heat exchange of the reaction, and reduces the time required. The process can be carried out in a single reactor or in a plurality of reactors handling the steps of the process in sequence, in the latter case being truly cyclical and continuous.

The ammonium chloride may be dissociated into HCl and ammonia outside the reactor and the dissociation products may be optionally introduced, in nonstoichiometric proportions but that is not preferred.

Advantages of the process are the accomplishments of its objectives as above stated and especially in more rapid chlorination and better control of temperature.

The following examples illustrate the invention without limiting the generality of what is elsewhere herein stated.

EXAMPLE 1

A mixture of 400 g. KCl, 350 g. LiCl, 30 g. $MnCl_2$ were placed in a reaction flask having three lateral tubular extensions, to which gas recovery apparatus were attached by valves, which had a centrally mounted agitator and a heating coil. The agitator was run at 700 r.p.m., the temperature set at 350° C. and the mass fused. 150 g. of bauxite mineral containing 44% iron was added, of which 40% of the grains were less than 50 m$\mu$ in size and the remainder between 50 and 100 m$\mu$. The temperature was raised to 510–530° C. and a current of hydrogen was admitted in quantity sufficient to partly reduce the iron oxide of the bauxite. The temperature was then reduced to 350–400° C. and 27 g. of $NH_4Cl$ were added little by little, the temperature being raised toward the end of the release of $NH_3$ to 510–530° C. At the end of 1 hr., 45 min., 92.4% of the $NH_3$ from the $NH_4Cl$ had been recovered. The iron oxides had in the meantime been chlorinated and the chlorine was now released at 510–530° C. by passing a current of oxygen through the agitated suspension. In 3 hours all the chlorine of the $NH_4Cl$ had been recovered.

EXAMPLE 2

The residual reaction mass from Example 1 was taken and hydrogen was passed into it at a rate of 10 liters per hour at 500–530° C. for 3 hours with agitation at 750 r.p.m. The oxides were reduced to a lower valence but not fully reduced and the temperature was lowered to 350–360° C. 27 g. of $NH_4Cl$ were introduced and toward the end the temperature was raised to 510° C. After 1 hr., 40 min., 93.5% of the ammonia had been recovered. The chlorinated oxides in suspension received a current of oxygen at 510–520° C. and all the chlorine had been released and captured in 3 hr., 10 min.

EXAMPLE 3

400 g. KCl, 350 g. LiCl and 30 g. $MnCl_2$ were put into the apparatus of Example 1, heated to 350–360° C. with agitation 750 r.p.m.; 125 g. of finely divided iron ore (magnetite) from Segré (France), containing 66% Fe, were added. The iron was present as $Fe_3O_4$ and its granulometry was 12% larger than 50 m$\mu$, 14% between 40 and 50 m$\mu$, and 74% less than 40 m$\mu$. With the temperature at 350–360° C., 27 g. of $NH_4Cl$ were admitted to the midst of the molten medium with a light current of N. At the end of the introduction the temperature was raised to 510–530° C., and in 1 hr., 40 min. 96.3% of the ammonia had been recovered. The chlorinated ore in suspension was treated with a current of oxygen at 510–530° C. and in 3hr. and 15 min. all the chlorine had been released and captured.

EXAMPLE 4

The reaction mass of Example 3 was used and the oxide was reduced by a hydrogen current as in Example 3. The process continued as in Example 3 and at the end of 1 hr., 45 min., 94.8% of the ammonia in the ammonium chloride had been released and recovered. A current of oxygen was then bubbled through the reaction mass and the totality of the chlorine in the ammonium chloride had been released and recovered at the end of 3 hr., 20 min.

EXAMPLE 5

The reaction mass of Example 3 was used but omitting the manganese. The molten mixture was thus 400 g. of KCl and 350 g. of LiCl. Into this molten mass was mixed 125 g. of iron ore containing 66% iron. The process proceeded as in Example 3 and 95.4% of the ammonia was recovered. The yield was taken during the first two hours and it was found that there was a release of 7.4% in each hour. In Examples 3 and 4 the yield of chlorine in the first two hours was 23 to 25%.

EXAMPLE 6

400 g. of KCl, 350 g. of LiCl and 25 g. of CuCl were mixed and heated to 350° C. When it became molten, iron minerals from Segré were admixed in the amount of 125 g., finely divided. Operating under the same conditions as Examples 3 and 4, 94.4% of the ammonia was recovered in 1 hr., 50 min., and in a succeeding step which lasted 3 hr., 30 min., the totality of the chlorine was recovered.

EXAMPLE 7

A molten mixture of 98 g. of NaCl, 391 g. of KCl, 391 g. of LiCl, and 35 g. of $MnCl_2$ was made. Iron mineral from Segré was added in the quantity of 125 g. and the process was carried out as in Example 3. In 1 hr., 40 min., 95.4% of the ammonia had been recovered, after which the dechlorination took place with the total release of the chlorine in 4 hr., 10 min.

EXAMPLE 8

A mixture of 400 g. of KCl, 350 g. of LiCl, 30 g. of $MnCl_2$, and 250 g. of $FeCl_3$ corresponding to 79 g. of iron in a Keller flask having 3 lateral tubular orifices, was supplied with a central agitator and heated by a coil. Agitation was at 750 r.p.m. and at a temperature between 510 and 530° C. Oxygen was flowed through the liquid mass at a rate of 12 liters per hour. In 13 hours the totality of the chlorine in the ferric chloride had been recovered. After purging the reactor with nitrogen and continuing agitation at the same temperature, the mass was treated by hydrogen sufficient to partly reduce the ferric oxide derived from the ferric chloride to a lower valence approximating $Fe_3O_4$. The temperature was then reduced to 340–350° C. and 27 g. of ammonium chloride were added. At the end of this introduction the temperature was raised to 510–530 C. and 93.6% of the ammonia was released and recovered in 1 hr., 30 min. The mass was then treated at the same temperature by a current of oxygen and the totality of the chlorine was recovered in 3 hr., 15 min.

Among the advantages of the process are the total recovery of chlorine from ammonium chloride and highly efficient release of ammonia, the recovery of the released gases being by standard methods. Other advantages are the simplicity of the process, its controllability and its adaptability to the use of initiators in various states, either pure or contaminated by other ingredients.

As many apparently widely different embodiments of the present invention may be made without departing from the spirit and scope thereof, it is to be understood that the invention is not limited to the specific embodiments.

What is claimed is:

1. The method of recovering chlorine from a metallic chloride of the type of iron, nickel and cobalt chlorides which comprises mixing the metallic chloride in finely divided state with a mixture of molten alkali metal chlorides and flowing oxygen through the molten mass at about 510 to about 530° C.

2. In a method of liberating chlorine and ammonia from ammonium chloride wherein a mixture of ammonium chloride and a partly reduced metal oxide are in one step subjected to conditions of reaction favorable to the release of ammonia and the fixation of chlorine on the metal oxide, and the chlorinated oxide is thereafter subjected to conditions of reaction favorable to the liberation of the fixed chlorine, the improvement comprising the steps of forming a suspension of finely divided partly reduced metal oxide chosen from the group Fe, Ni, Co oxides in a mixture of molten alkali metal chlorides, contacting the said suspension with ammonium chloride, subjecting the suspension in sequence to a temperature of 300–420° C. and to conditions of reaction favorable to the release of ammonia and the fixation of chlorine on the metal oxide, and to a temperature of 510–530° C. and to conditions of reaction favorable to the release of chlorine from the chlorinated oxide.

3. A method according to claim 2 in which the release of chlorine is accomplished by mixing a free oxygen containing gas with the suspension at elevated temperature, and the oxide, freed of chlorine, is partially reduced within the suspension by passing a reducing gas therethrough under conditions of reaction favorable to the reaction at a temperature of about 500–550° C.

4. The method of claim 2 wherein the finely divided partly reduced metal oxides have a particle size of 20 to 250 microns.

5. A method according to claim 2 in which the ammonium chloride is carried into the reaction mass in an inert gas and the released ammonia is withdrawn therefrom and recovered and the metallic oxide is chlorinated.

6. A method according to claim 5 in which the chlorinated oxides in suspension are mixed with a free oxygen containing gas, whereby chlorine is released by means of such oxygen containing gas and recovered and the partly reduced metallic oxides are more fully oxidized.

7. A method according to claim 6 in which the more fully oxidized reaction mass is purged of oxygen by an inert gas and partly reduced by admixture with a reducing gas in repetition of the cycle.

8. A method according to claim 2 in which the suspension contains an activator for the partly reduced oxides, chosen from the group of the oxides and salts of Cu, Mn, and rare earth metals.

9. A method according to claim 2 in which the mixture of molten salts has a melting point below the point of sublimation of the ammonium chloride.

10. A method according to claim 2 in which the process is initiated with a metallic chloride instead of an oxide, and the metallic chloride is oxidized, and partially reduced, the process then proceeding as in claim 2.

11. The liquid phase method of preparing ammonia and chlorine from ammonium chloride which comprises decomposing ammonium chloride in contact at a temperature of 300–420° C. with a liquid reaction mass of molten alkali metal chlorides containing in suspension a finely divided, partly reduced, metal oxide of the type of metal having a valence greater than two when fully oxidized and which is selected from the group consisting of Fe, Ni, Co.

12. A method according to claim 3 in which additional ammonium chloride is added to the suspension and the process steps repeated.

13. A method of liberating chlorine and ammonia from ammonium chloride which comprises suspending finely divided metal oxide chosen from the group of Fe, Ni, Co oxides in a mixture of molten alkali metal chlorides, partially reducing the metal oxide in the suspension, mixing ammonium chloride with the suspension at a temperature of from 300 to 420° C. and at a pressure favorable to the liberation of ammonia and the fixation of chlorine on the metal oxide, and mixing an oxidizing gas with the suspension after the liberation of the ammonia under conditions of temperature and pressure favorable to the liberation of chlorine from the chlorinated metal oxide.

References Cited

UNITED STATES PATENTS 2,542,464    2/1951    Black et al. _____ 252—441

FOREIGN PATENTS 14,001    10/1887    Great Britain _____ 23—193
15,649    8/1890    Great Britain _____ 23—193

OSCAR R. VERTIZ, Primary Examiner

H. S. MILLER, Assistant Examiner

U.S. Cl. X.R.

23—219